US009269112B1

(12) United States Patent
Manimaran

(10) Patent No.: US 9,269,112 B1
(45) Date of Patent: Feb. 23, 2016

(54) INTEGRATING LOCATION-BASED SOCIAL MEDIA DATA WITH ENTERPRISE BUSINESS INTELLIGENCE APPLICATIONS

(71) Applicant: WeLink, Inc., San Jose, CA (US)

(72) Inventor: Karthik Mavaneethan Manimaran, San Jose, CA (US)

(73) Assignee: WeLink, Inc., San Jose, CA (US)

( * ) Notice: Subject to any disclaimer, the term of this patent is extended or adjusted under 35 U.S.C. 154(b) by 0 days.

(21) Appl. No.: 14/656,494

(22) Filed: Mar. 12, 2015

(51) Int. Cl.
*G06Q 99/00* (2006.01)
*G06Q 50/00* (2012.01)
*H04L 29/08* (2006.01)
*G06Q 10/06* (2012.01)

(52) U.S. Cl.
CPC .............. *G06Q 50/01* (2013.01); *G06Q 10/067* (2013.01); *H04L 67/10* (2013.01); *H04L 67/18* (2013.01)

(58) Field of Classification Search
USPC .............................................. 705/319; 726/1
See application file for complete search history.

(56) References Cited

U.S. PATENT DOCUMENTS

| 2014/0081881 | A1* | 3/2014 | Radhakrishnan | 705/319 |
| 2014/0150016 | A1* | 5/2014 | Feng et al. | 725/34 |
| 2015/0047034 | A1* | 2/2015 | Burnham et al. | 726/23 |

* cited by examiner

Primary Examiner — Tsan-Yu J Huang
(74) Attorney, Agent, or Firm — Perkins Coie LLP

(57) ABSTRACT

Embodiments of an information management system and related methods are disclosed. In some embodiments, the system collects social media contents and metadata from social media networks or other sources. The system then enhances the received social media data with location and other information. Furthermore, the system receives business data and information regarding business goals from a business intelligence platform owned or operated by a business entity. To satisfy the business goals, the system sorts, filters, or otherwise processes the enhanced social media data to extract business intelligence that reflect the sentiment and behavior patterns of social media users in connection to the operations, products, or services of the business entity.

21 Claims, 10 Drawing Sheets

INTEGRATING LOCATION-BASED SOCIAL MEDIA DATA WITH ENTERPRISE BUSINESS INTELLIGENCE APPLICATIONS

RELATED APPLICATION

The present application is related to U.S. patent application Ser. No. 14/656,252, filed Mar. 12, 2015 and titled "COLLECTING AND GENERATING GEO-TAGGED SOCIAL MEDIA DATA THROUGH A NETWORK ROUTER INTERFACE", which is incorporated by reference in its entirety.

TECHNICAL FIELD

The present application is related to utilizing social media data for enterprise business and, in particular, to monitoring and analyzing social media data to generate business intelligence.

BACKGROUND

Communication is shifting from traditional platforms—such as phone and paper—to digital media. Among the notable digital media are email, blogs, and social media networks. Social media networks are operated by companies including Twitter, Instagram, Facebook, Google Plus, YouTube, Flickr, Picasa, Foursquare, Nextdoor, Pinterest, Yelp, 500px, Photobucket, Panaromio, Meetup, Eventbrite, Dailymotion, Viddy, Soundcloud, YikYak, Snapchat, Whisper, Secret, TripAdvisor, Expedia, Travelocity, etc. Social media data generally contain public descriptions of the views or activities of social media users. Therefore, analysis of social media data can uncover sentiment or behavior patterns and other useful information regarding social media users.

Businesses depend on their customers, and greater knowledge about their clientele helps businesses address consumer needs more thoroughly. Therefore, information regarding current and prospective customers that can be derived from social media data can be helpful to businesses. Today, business entities large and small often employ business intelligence tools to analyze business data, including customer-related data obtained from traditional data sources, such as customer profiles, satisfaction surveys, etc. The business intelligence tools include business intelligence dashboards, enterprise resource planning systems, and customer relationship managers. Businesses can benefit from strengthened business intelligence processes that can be achieved by integrating location-based social media data with other business data and performing broader and more comprehensive customer-oriented analysis.

BRIEF DESCRIPTION OF THE DRAWINGS

Various embodiments are disclosed in the following detailed description and accompanying drawings.

DETAILED DESCRIPTION

The present application discloses an information management system and related methods which enhance social media data with location information and extract business intelligence from the enhanced social media data. The system receives business data and information regarding business goals from a business intelligence platform owned or operated by a business entity and sorts, filters, or otherwise analyzes the enhanced social media data to satisfy the business goals. Specifically, the business intelligence extracted from the enhanced social media data can reflect customer opinions related to the business or general customer sentiment and behavior patterns and thus can help improve the structure and operation of the business entity or the products and services offered by the business entity. The system can communicate with the business intelligence platform through an application programming interface (API), a Web services interface, or other mechanisms.

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and the equivalent.

Numerous specific details are set forth in the following description in order to provide a thorough understanding of the invention. However, the invention may be practiced without some or all of these specific details. For the purpose of clarity, technical material that is known in the technical fields related to the invention has not been described in detail so that the invention is not unnecessarily obscured.

Figure 1:
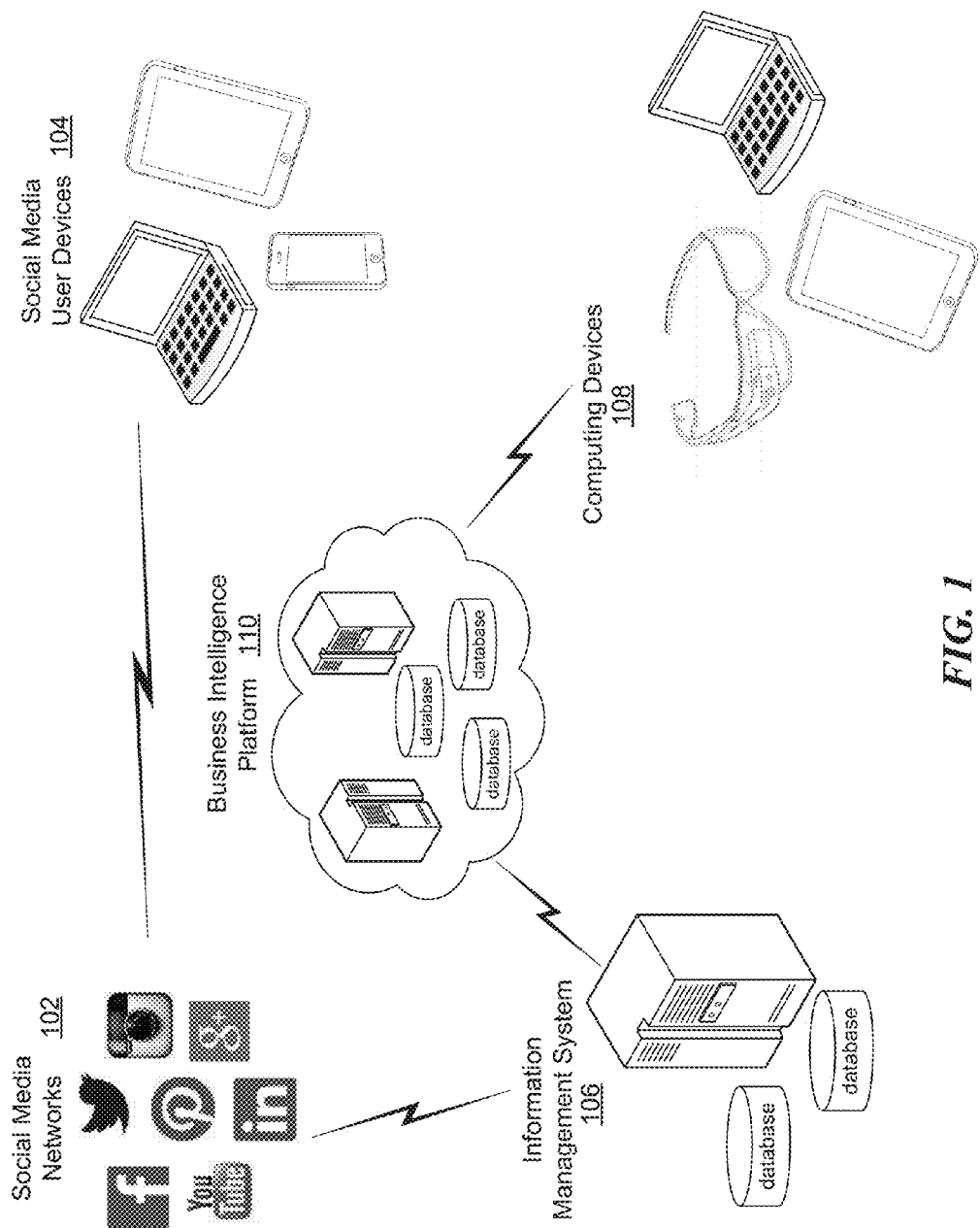
FIG. 1 is an environment diagram illustrating an example environment in which an information management system disclosed in the present application can operate.

FIG. 1 is an environment diagram illustrating an example environment in which the information management system can operate. In some embodiments, the information management system 106 comprises servers and databases that possess sufficient data storage and processing power as well as networking and communication capabilities. In general, users of social media networks 102, maintained by companies such as Facebook, Twitter, Instagram, etc., produce social media contents through user devices 104, such as mobile phones, tablets, laptop computers, desktop computers, and wearable devices. These user devices 104 transmit the social media contents to the social media networks 102 across computer networks, such as the Internet or a cellular network. In turn, the system 106 receives the social media contents and metadata from these social media networks 102, social media plugins, or social media data collectors that aggregate social media data streams, such as Firehose, through computer networks. The social media metadata can include information identifying a social media user, the user's device, the user's location, and so on. The system 106 can enhance the received social media data with additional information to increase its value, such as additional location information.

In some embodiments, the information management system 106 communicates with a business intelligence platform 110 owned or operated by a business entity to generate business intelligence from location-based social media data for the business entity. The business intelligence platform 110 generally possesses strong computation power and storage capabilities for processing a large volume of various types of business data regarding products and services, customers, stores and operations, etc. The business intelligence platform 110 can be implemented by a server farm, a cloud computing platform, or similar computing facilities. The information management system 106 can analyze location-based social media data with respect to given business data according to the business goals and policies of the business entity. The analysis result can include relevant summaries and statistics that provide insight into the business functions of the business entity.

In some embodiments, the information management system 106 makes the analysis result available to the business intelligence platform 110 in one or more ways, such as through integration into the backend or the frontend of the business intelligence platform 110. For example, the business intelligence platform 110 can include a backend reporting component and a frontend dashboard. The reporting component can invoke the information management system 106 and send the result produced by the information management system 106 to the dashboard for display. Alternatively, the dashboard can include an option for a user to select the information management system 106 from a number of business intelligence tools or social media monitoring tools for use based on a subscription or other licensing methods. Various users related to the business entity can then obtain the analysis result and other business intelligence information by accessing the business intelligence platform 110 through their user devices 108. These users can include people in management, marketing, sales, or other relevant departments, and their devices can include mobile phones, tablets, laptop computers, desktop computers, or wearable devices.

Figure 2:
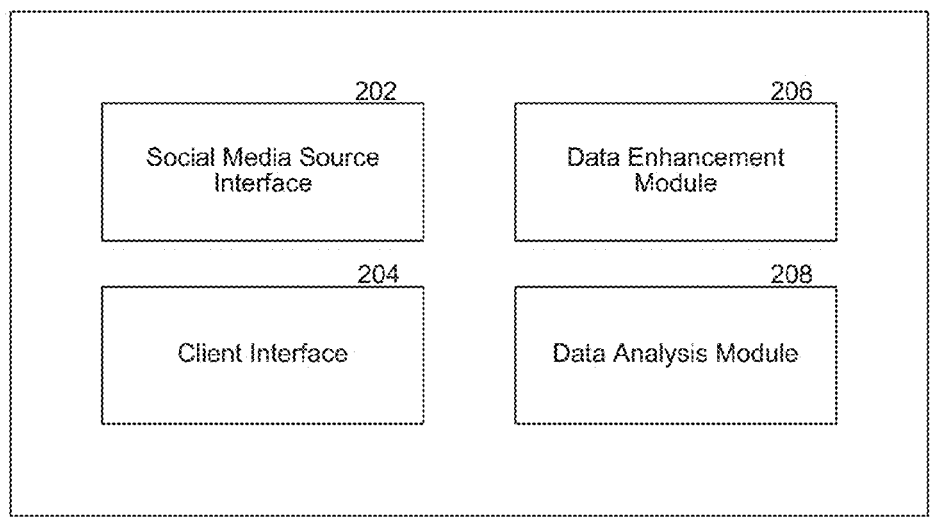
FIG. 2 illustrates example components of the information management system.

FIG. 2 illustrates example components of the information management system. In some embodiments, the system includes a social media source interface 202, a data enhancement module 206, a client interface 204, and a data analysis module 208.

In some embodiments, the social media source interface 202 manages interactions with social media sources, including social media networks, social media plugins, and social media data collectors. The social media source interface 202 obtains social media contents and metadata from these social media sources through a published API or any other specified access mechanism. For example, Facebook makes data available through an API, while Firehose delivers data in a supported format, such as JSON. The social media data can also obtained from crawling social media websites. The social media data can be received on a daily basis, upon a specific request from a computing device, or according to any other schedule.

Figure 3:
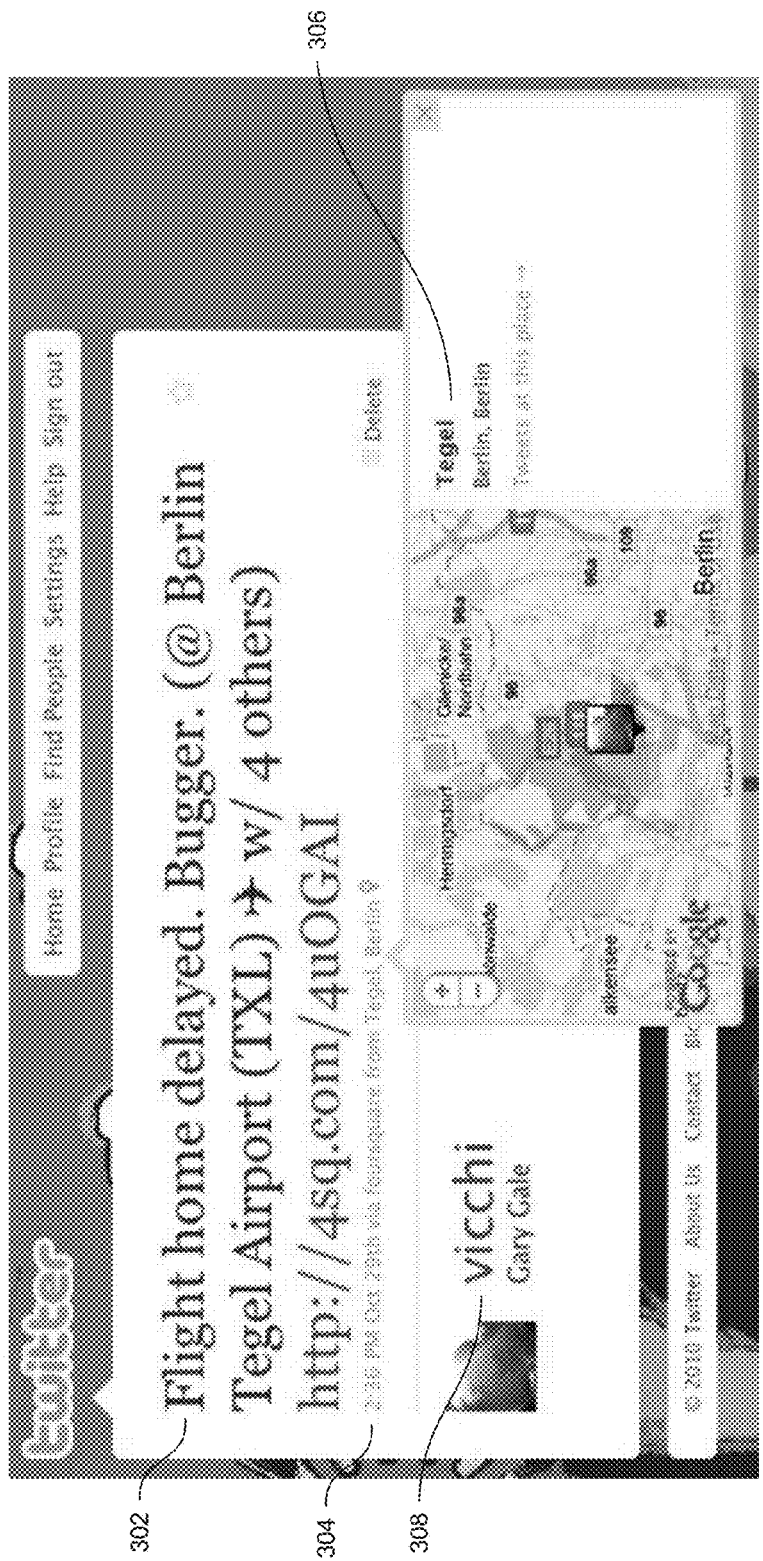
FIG. 3 illustrates an example social media communication that can be included in the social media data received by the information management system.

FIG. 3 illustrates an example social media communication that can be included in the social media data received by the information management system. The data corresponds to a tweet. The tweet includes a message 302, which is normally considered to be the content of the tweet and includes text but could include other types of data, such as images and videos. The content may be dissected to deduce various types of information regarding the social media user or the author of the message. For example, the word "flight" may indicate that the user is travelling, the word "bugger" may indicate frustration, the words "Tegel Airport" and "(TXL)" may indicate the user's current or recent location, and the uniform resource location (URL) "http://4sq.com/4uOGAI" and the referenced content may indicate additional interests of the user. The tweet also includes author information 308 indicating who composed and sent the message, time information 304 indicating when the message was sent, and location information 306 indicating from where the message was sent. Such information can be considered part of the content or, as is more common, part of the metadata of the tweet. Not all types of metadata may exist for a tweet. For example, when a user does not turn on the geotag feature, the location information would not be stored with the content.

Social media data collectors often compute or derive additional metadata to add values to the original social media contents. For example, together with a tweet, Firehose may make available language information indicating in which language the message was written and Klout information indicating the author's influence ranking. The social media source interface 202 can also access additional engines that analyze social media contents to obtain additional social media metadata. Such engines include sentiment analysis engines, which often rely on the use of natural language processing, computational linguistics, and similar techniques to identify and extract subjective information in source materials. Furthermore, the social media source interface 202 can obtain additional social media metadata in response to receiving queries from a business intelligence platform. For example, given relevant business information, customer loyalty data can be acquired, such as the net promoter score (NPS).

In some embodiments, the data enhancement module 206 enriches the social media contents and metadata received from the social media sources. One factor that is important for analyzing social activities is user location. However, not every piece of social media data includes location information. For example, location services are turned off by default with Twitter, so a user needs to turn on the location services to attach a location to a tweet. Therefore, one way the data enhancement module 206 can enrich the received social media data is to uncover as much location information as possible.

As discussed in the related application U.S. patent application Ser. No. 14/656,252, the information management system can collect information from network routers and use the information to enrich social media data received from various social media sources. In some embodiments, the data enhancement module 206 first relies on a data aggregator to collect router data from network routers regarding a network router, devices connected to the network router, or users using the connected devices. Specifically, the router data can include the location of the network router and for a connected device, the MAC address and locations of visited websites together with the times of visits. The data enhancement module 206 then joins the network router data to the social media data mainly based on timestamps.

In some embodiments, the data enhancement module 206 enhances the social media data in various ways based on the joined data. In one approach, when a first and a second devices are connected to the same network router, even if the social media data transmitted by the first device does not include location information, if the network router is associated with location information or if the social media data transmitted by the second device includes location information, the data enhancement module 206 can assign the same location information to the social media data transmitted by the first device. The reason for this is that both devices are connected to the same network router and thus are typically located in the proximity of the router. In addition, based on the MAC address of the first device, even if the first device later is connected to a different network router or communicates with a different social media network, the data enhancement module 206 can associate the published social media data with the same first device and its user to obtain more information about the user. The information generated by a network router can include additional detail, such as device types, timestamps of online activities performed outside the social media, etc., which can also be used to enrich the received social media data and make additional inferences regarding the social media users.

In some embodiments, the client interface 204 manages communications with the business intelligence platform owned or operated by a business entity. The client interface 204 communicates with the business intelligence platform differently depending on the mode of communication. The information management can have an API, and it can communicate with the business intelligence platform through that API in one mode of communication. Under the API, the client interface 204 receives queries for location-based social media data from the business intelligence platform based on one or more attributes of the social media data managed by the system and returns the query results containing one or more attributes. The business intelligence platform can present the query results graphically, further analyze the query results together with existing business data, collect additional business data based on the query results, and so on. The information management can also have a web-based interface to be used for another mode of communication. For example, the client interface 204 receives queries for social media data from a Web browser and returns query results to form an iFrame in a Web page generated by the business intelligence platform. In yet another mode of communication, the information management system is packaged as a Web plugin. For example, the client interface 204 receives queries for social media data from a Web browser and returns query results to be embedded in a Web page generated by the business intelligence platform.

As the location-based social media data can serve as a source of people's opinions regarding a business, the business intelligence platform can make a variety of business data available to the client interface 204 that can be correlated with the available social media data to improve different aspects of the business. The business data can be related to the business structure or operation, such as the addresses of retail and manufacturing locations, the hours of operation of each location, information regarding the personnel working at each location, etc. The business data can be related to the products or services offered by the business entity, such as the prices, the inventories at the manufacturing sites and the retail stores, the discounts and promotions available in the retail stores and online, the budget and sales figures, etc. The business data received from the business intelligence platform and the location-based social media data managed by the information management system are then combined and analyzed for given business objectives, as discussed below. In general, business objectives include understanding customer reactions to certain aspects of a business, studying customer shopping and spending preferences, analyzing the interplay between customer influences and marketing strategies, and so on. The client interface 203 then sends the analysis result to the business intelligence platform in accordance with the mode of communication. The business intelligence platform can send the relevant business data and information regarding the business goals to the client interface 204 on a regular basis, when changes occur in any aspect of the business, and so on. On the other hand, the client interface 204 can send the analysis result to the business intelligence platform in response to receiving new business data from the business intelligence platform, as new location-based social media data relevant to the business becomes available, on a regular basis, and according to other schedules.

In some embodiments, the data analysis module 208 processes the collected and enhanced social media data with respect to any business data received from the business intelligence platform. The processing generally includes correlating the two types of data followed by sorting or filtering. For example, the business data may be as simple as the addresses of a retail location or the name of a product. The data analysis module 208 can then generate various summary information and business insight corresponding to the specified retail location or product depending on the business objectives. For a specific location, the data analysis module 208 can focus on the social media data associated with the network routers located at or near that location, geotags specifying that location in the social media metadata, keywords specifying or describing that location in the social media contents, and so on. For a specific product, the data analysis module 208 can focus on keywords, images, or videos specifying or describing the product, various forms of recognition or criticism of the product, or other references to the product in the social media data. In addition, the data analysis module 208 can take into consideration attributes and activities of the social media users that may not be directly related to the business. For example, a user's Klout as determined by the number of followers, the number of comments received on the user's posts, or other measures, a user's general shopping preferences by price, category, location, etc., can be among the important factors to consider as the business entity makes business decisions.

Figure 4:
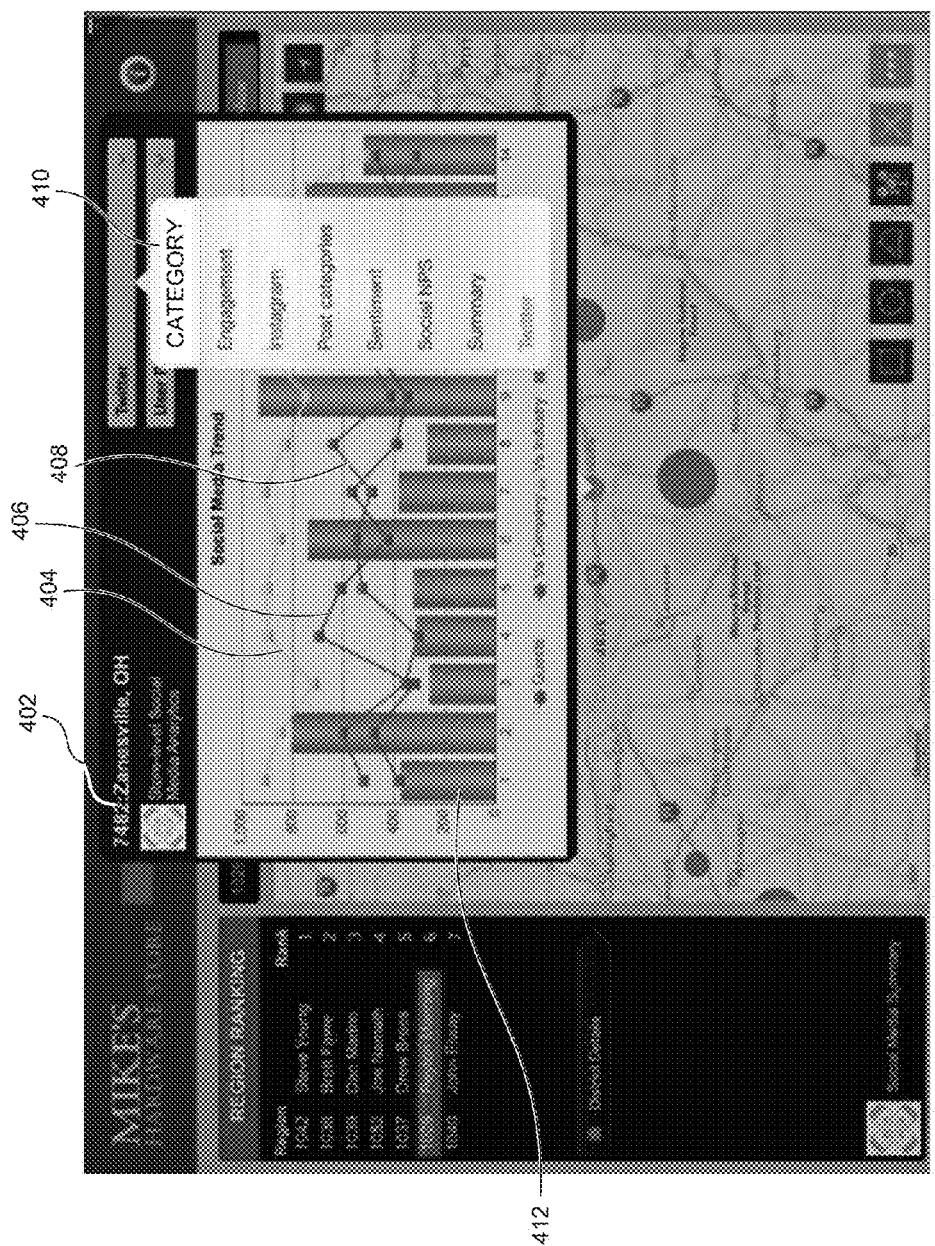
FIG. 4 illustrates a sample output of the information management system showing certain social media trends related to a business.

FIG. 4 illustrates a sample output of the information management system showing certain location-based social media trends related to a business. The output corresponds to a particular store located in Zanesville, Ohio, as shown in 402, for a period of two weeks or 14 days, as shown on the x-axis of the graph. The location of Zanesville, Ohio and the timespan of two weeks would correspond to the geotags and timestamps associated with the relevant social media data. A user is given a choice for the type of social media data to review for the store, as shown in the category menu 410, including the number of Instagram posts, nature of sentiments, and the NPS or the degree of loyalty. Such data can be used by the business entity in managing customer relationships and improving business operations. The chosen type of social media data is shown on the y-axis of the graph. In this example, the data analysis module 208 has generated three data series for display: one for the store 406, one for the entire company 408, and one for the industry 404, to provide a benching context for interpreting the data specific to the store.

In the same example illustrated in FIG. 4, the graph also includes relevant business data 412 provided by the business intelligence platform that can be compared with the social media data to produce further business insight. Such business data can be the number of people visiting the store, the number of repeat visitors of the store, the number of customers using the wireless network of the store, the amount of sales made in the store, or other statistics that can be compiled by the store. As one example, when the number of Instagram posts related to a store is large and when the number of customers visiting the store is also large, it can mean that the product on display in the store is attracting a great deal of attention. As another example, when the number of customers using the wireless network of the store is large and yet the number of social media posts related to the store is small, it can mean that at least some customers are tech-savvy or stay in the store to use the wireless communication but do not necessarily have much interest in the products in the store. As yet another example, when the NPS is low but the number of repeat customers is high, it can mean that the customers are not main users of social media or that the repeat visitors are not necessarily repeat customers of the store.

Figure 5:
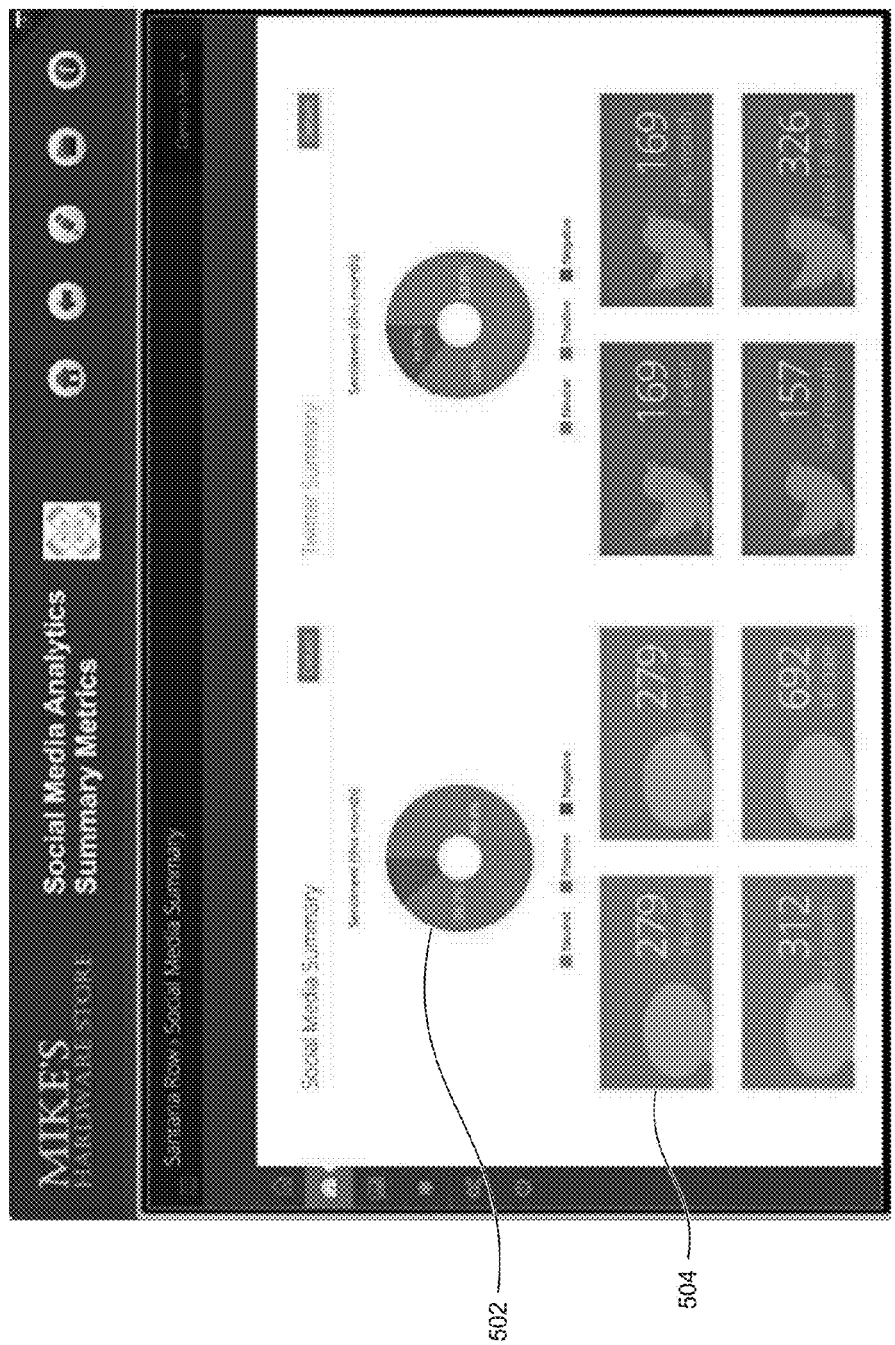
FIG. 5 illustrates a sample output of the information management system showing summary information regarding sentiments related to a business expressed on social media.

FIG. 5 illustrates a sample output of the information management system showing summary information regarding sentiments related to a business expressed on social media. Sentiment information can be valuable to a business entity as it reflects customer reactions in a direct form. In this example, the data analysis module 208 has generated a pie chart 502 for display covering three types of sentiments, namely positive, negative, and neutral, for all the social media data related to a store during the past month. It can also generate similar graphs and statistics for separate social media networks. In addition, the data analysis module 208 has computed the number of social media communications 504 for display within each of a number of timeframes. Similar numbers can be shown for each type of sentiment separately. Such statistics can inform the business entity of how well a store or a particular product is received, how customer reaction changes over time, how popular a type of social media is as a discussion forum for the business, and so on.

Figure 6A:
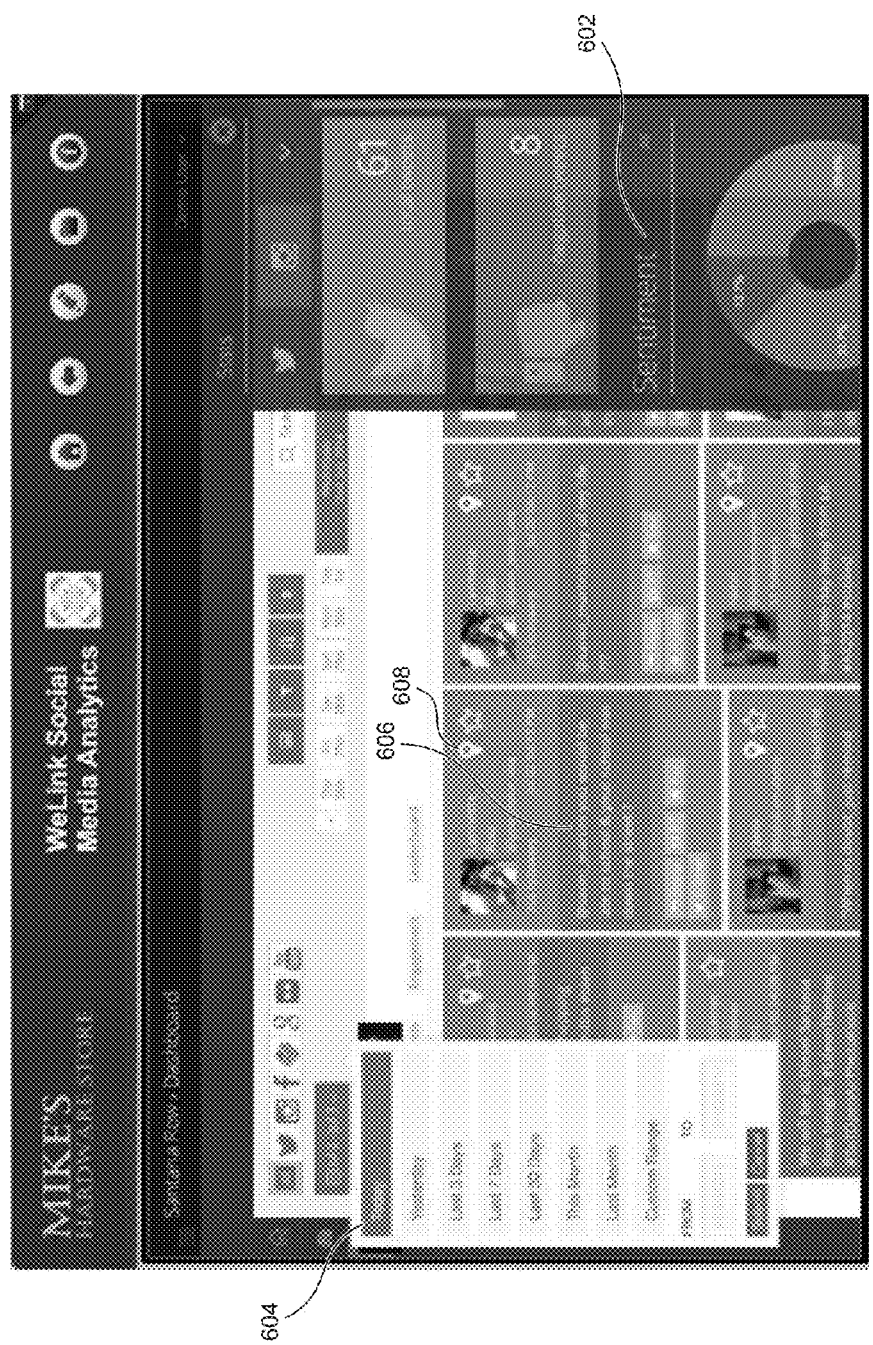
FIG. 6A illustrates a sample output of the information management system showing individual social media communications related to a business.

FIG. 6A illustrates a sample output of the information management system showing individual social media communications related to a business. A user is allowed to select a timeframe, using the menu 604, for example, to limit the social media communications to be displayed. In response to the user selection, a summary of the data that falls in the selected timeframe can be computed and displayed dynamically. In this example, the summary 602 includes the total number of social media communications as well as the number and percentage for each type of sentiment. Each of the social media communications 606 can be shown in a specific format. For example, the display can include a colored background, where different colors correspond to different types of sentiment. The display can also include a location icon 608 indicating that the social media communication has a geotag, a timestamp indicating the time of publication, a number of followers of the author, a number of likes, etc. The summary information and the individual posts allow the business entity to see actual examples reflecting a certain type of sentiment and understand detailed reasons forming the type of sentiment, further allowing the business entity to form appropriate responses or take appropriate actions.

Figure 6B:
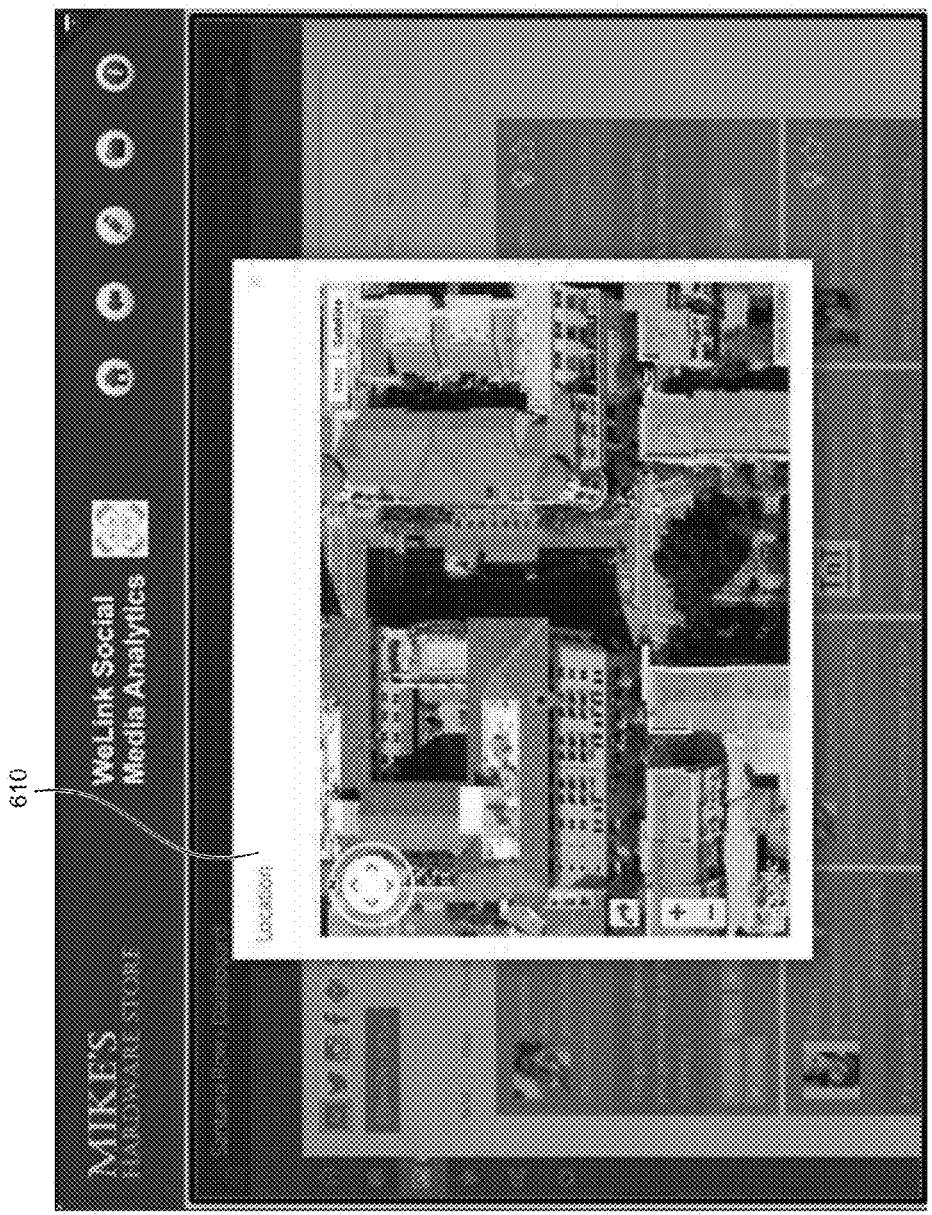
FIG. 6B illustrates a sample output of the information management system showing location information included in the social media data related to a business.

FIG. 6B illustrates a sample output of the information management system showing location information included in the social media data related to a business. In the example illustrated in FIG. 6A, when a user accesses the location icon 608, a map of 610 the corresponding location is displayed, which can be zoomed in or out. Depending on how the location information was obtained, such as via a GPS system or a network router, the location information can have a fine granularity that allows the user to see nearly exactly where the author of the social media communication was located, such as which store or even which section within the store. Such location information can be utilized by the business entity in many ways. As one example, when a number of recent social media communications indicate a preference for a particular product and when the location information indicates that the authors of these social media communications were all near a particular store, a manager can request a large stock of that product for that store or increase marketing efforts in other stores. As another example, when the social media communication indicates that the author was displeased with the customer service in a supermarket, and the location information indicates that the author was in the produce section, a manager can identify the people working in the produce section at or near the time of publication to address the author's negative sentiment.

Figure 7:
FIG. 7 illustrates a sample output of the information management system showing attributes of the social media users and contents related to a business.

FIG. 7 illustrates a sample output of the information management system showing attributes of the social media users and contents related to a business. While each current or prospective customer can be important to a business, business strategies can be fine-tuned depending on certain attributes of the customers. For example, the data analysis module 208 can sort the numbers of followers (which can be related to the Klout) of everyone who has visited one of the stores, commented on one of the products or services, or is otherwise related to the business, and present a list 702 of those social media users having the largest numbers of followers. The business entity can utilize such information in a number of ways. As one example, the business entity can handle negative sentiments from those people with a higher priority, or it can work out a promotion deal with those people. As another example, the business entity can set a first threshold for the amount of influence and a second threshold for the number of social media users having at least that much influence, and use such measures to assess the popularity of a product, the effectiveness of marketing campaigns, and so on. The contents of the social media data can also provide certain insight to the business entity. For example, the business entity can identify a set of keywords related to the business and determine how these keywords appear in the social media contents to similarly direct marketing, sales, or manufacturing efforts. Alternatively, the business entity can examine the list of most frequently used keywords 704 in the social media contents and use them to identify overall market trends, to gauge customer reactions of its products and services as compared to other products and services, or otherwise evaluate its business in a broader context.

While the examples that have been presented focus on a particular store, the information management system can perform similar analysis for each of the other stores operated by the business entity, compare or aggregate the results obtained for multiple locations, perform similar analysis for the entire business, and so on. For example, the business can aggregate the results for all the stores on the west coast of the U.S., similarly aggregate the results for all the stores on the east coast, compare the aggregated data, and study the results or other relevant data to explain the comparison outcome. The business entity can also eliminate from consideration for the aggregation computation any store with annual revenue below a certain threshold. In general, the scope of each analysis is in no way limited and is only set by a user.

Figure 8:
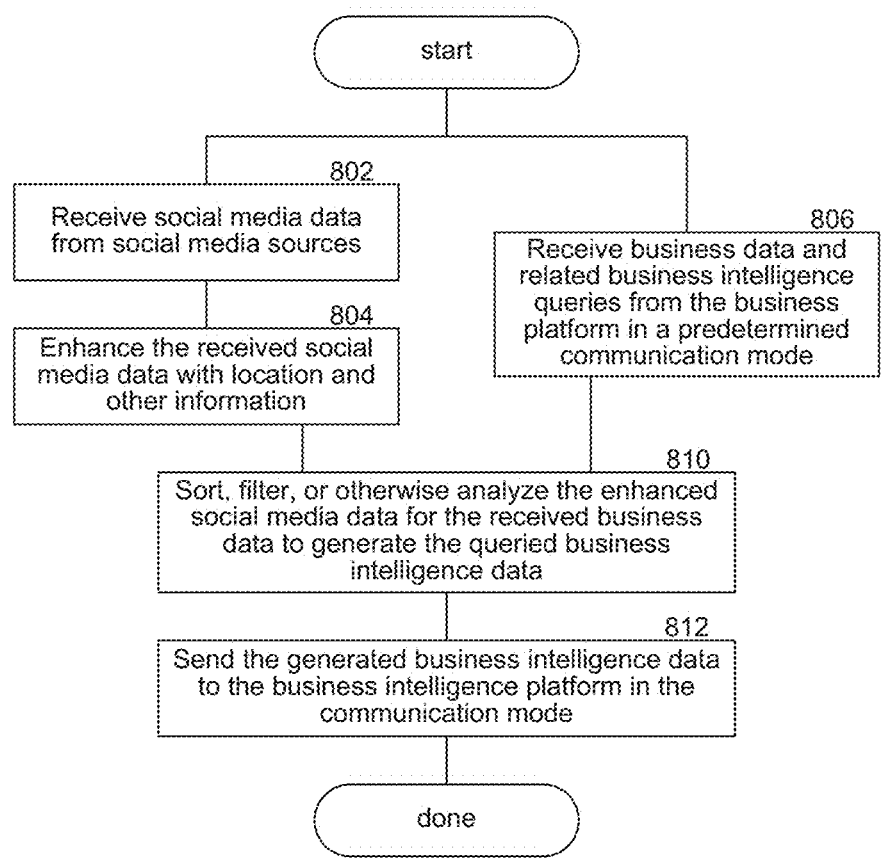
FIG. 8 illustrates a process performed by the information management system for extracting business intelligence from social media data.

FIG. 8 illustrates a process performed by the information management system for extracting business intelligence from social media data. In step 802, the information management system receives social media data from social media sources, such as social media networks, social media plugins, or social media collectors. It can pull data from these sources from time to time or arrange for automatic delivery by these sources according to specific schedules. To ensure that the data delivered to a user is relatively up-to-date, the communication with the social media sources should be sufficiently frequent. In step 804, the system enhances the received social media data with additional information, including location information. Using additional location data from a network router, for example, the system can associate a new geotag with a social media posting or strengthen an existing geotag with additional detail.

In conjunction, in step 806, the information management system communicates with a business intelligence platform owned or operated by a business entity in one of the predetermined modes. For example, the communication can rely on an API of the information management system in one mode or through a web-based interface in another mode. The system initially receives relevant business data and business intelligence queries from the business intelligence platform. For example, the system may receive from a Web browser business data that indicates the location of a retail store, and a query for the distribution of different types of sentiment regarding the store as well as the products carried by the store. The query can further request the Klout indicator of every social media user who has expressed a negative sentiment in his or her social media communications. In step 810, in response, the system examines and dissects the enhanced social media data, by joining, sorting, filtering, mining, or other similar techniques, to determine the query result. In step 812, the system returns the query result to the business intelligence platform in a manner that depends on the predetermined mode. For example, the system can send properly-formatted query result back to the Web browser to populate an iFrame in a Webpage generated by the business entity.

Figure 9:
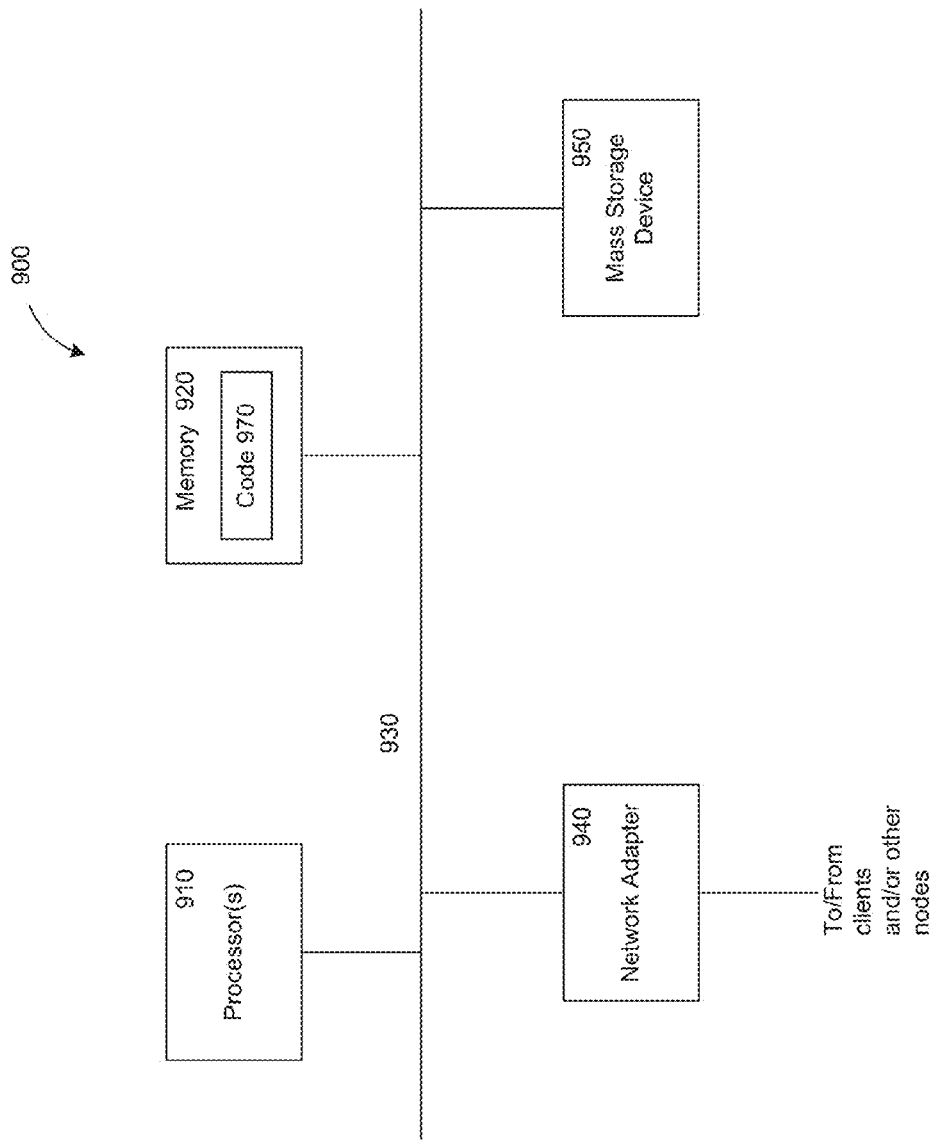
FIG. 9 is a high-level block diagram showing an example architecture of a computer, which may represent any electronic device, any server, or any node within a cloud service as described herein.

FIG. 9 contains a high-level block diagram showing an example architecture of a computer, which may represent any electronic device, such as a mobile device or a server, including any node within a cloud service as described herein, such as may implement the operations described above. The computer 900 includes one or more processors 910 and memory 920 coupled to an interconnect 930. The interconnect 930 shown in FIG. 9 is an abstraction that represents any one or more separate physical buses, point-to-point connections, or both, connected by appropriate bridges, adapters, or controllers. The interconnect 930, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus, also called "Firewire".

The processor(s) 910 is/are the central processing unit (CPU) of the computer 900 and thus control the overall operation of the computer 900. In certain embodiments, the processor(s) 910 accomplish this by executing software or firmware stored in memory 920. The processor(s) 910 may be, or may include, one or more programmable general-purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices.

The memory 920 is or includes the main memory of the computer 900. The memory 920 represents any form of random-access memory (RAM), read-only memory (ROM), flash memory, or the like, or a combination of such devices. In use, the memory 920 may contain code 970 containing instructions according to the techniques disclosed herein.

Also connected to the processor(s) 910 through the interconnect 930 are a network adapter 940 and a mass storage device 950. The network adapter 940 provides the computer 900 with the ability to communicate with remote devices over a network and may be, for example, an Ethernet adapter. The network adapter 940 may also provide the computer 900 with the ability to communicate with other computers.

The code 970 stored in memory 920 may be implemented as software and/or firmware to program the processor(s) 910 to carry out actions described above. In certain embodiments, such software or firmware may be initially provided to the computer 900 by downloading it from a remote system through the computer 900 (e.g., via network adapter 940).

CONCLUSION

The techniques introduced herein can be implemented by, for example, programmable circuitry (e.g., one or more microprocessors) programmed with software and/or firmware, or entirely in special-purpose hardwired circuitry, or in a combination of such forms. Software or firmware used for implementing the techniques introduced here may be stored on a machine-readable storage medium and may be executed by one or more general-purpose or special-purpose programmable microprocessors.

In addition to the above mentioned examples, various other modifications and alterations of the invention may be made without departing from the invention. Accordingly, the above disclosure is not to be considered as limiting, and the appended claims are to be interpreted as encompassing the true spirit and the entire scope of the invention.

The various embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random-access memory (RAM); magnetic disk storage media; optical storage media; flash memory devices; etc.).

These computer program instructions may also be stored in a computer-readable medium that can direct a computer, other programmable data processing apparatus, or other devices to function in a particular manner, such that the instructions stored in the computer-readable medium produce an article of manufacture, including instructions which implement the function/act specified in the flowchart and/or block diagram block or blocks.

The computer program instructions may also be loaded onto a computer, other programmable data processing apparatuses, or other devices to cause a series of operational steps to be performed on the computer, other programmable apparatuses or other devices to produce a computer-implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block of the block diagrams and/or flowchart illustrations, and combinations of blocks in the block diagrams and/or flowchart illustrations, can be implemented by special-purpose hardware-based systems that perform the specified functions or acts or by combinations of special-purpose hardware and computer instructions.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some, but not necessarily all, embodiments of the inventions.

It is to be understood that the phraseology and terminology employed herein are not to be construed as limiting and are for descriptive purposes only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

The invention claimed is:

1. A computer-performed method of enhancing business intelligence data with location-based social media feeds, comprising:
   receiving, by a processor, from a first network router connecting a specific network with the Internet, first router data regarding network communication between one or more content providers and one or more devices connected to the first network router in the specific network;
   receiving, by the processor, from a data provider, a first item including first details originally published by a first of the content providers and not tagged with a physical location, and a second item including second details originally published by a second of the content providers and tagged with a first physical location,
   wherein the first router data matches at least in part with the first item and with the second item;
   determining, by the processor, that the first and second items were associated with the first network router; and
   tagging, by the processor, the first details with the first physical location.

2. The computer-performed method of claim 1,
   wherein the first router data includes a first website address of a first website associated with the first content provider, and a first timestamp for visiting the first website,
   wherein the first router data includes a second website address of a second website associated with the second content provider, and a second timestamp for visiting the second website,
   wherein the first item includes the first details tagged with a third timestamp matching the first timestamp, and
   wherein the second item includes the second details tagged with a fourth timestamp matching the second timestamp.

3. The computer-implemented method of claim 2, further comprising:
   receiving, from a second network router, second router data regarding network communication with a third of the content providers by a specific device of a user connected to the second network router, a second physical location of the second network router, and a time range in which the specific device is connected to the second network router,
   wherein the second router data includes a third website address of a third website associated with the third content provider, and a fifth timestamp for visiting the third website;
   receiving, from the data provider, a third item including third details originally published by the third content provider, created by the user, and tagged with a sixth timestamp that falls in the time range but with no physical location; and
   tagging the third details with the second physical location.

4. The computer-implemented method of claim 1, wherein the first content provider and the second content provider are identical.

5. The computer-implemented method of claim 2, wherein the visiting of the first website and the visiting of the second website were performed by the same one of the one or more devices connected to the first network router.

6. The computer-performed method of claim 3, further comprising analyzing the first, second, and third items based on the physical location tags.

7. The computer-implemented method of claim 1, wherein the first network router is a wireless router.

8. The computer-implemented method of claim 1, wherein the one or more content providers include a social media network.

9. The computer-implemented method of claim 1, wherein the one or more devices include a mobile device.

10. A system of enhancing business intelligence data with location-based social media feeds, comprising:
    a processor and a memory storing a computer program containing instructions executable by the processor to perform a method, the method comprising:
      receiving, from a network router connecting a specific network with the Internet, router data regarding network communication between one or more content providers and one or more devices connected to the network router in the specific network;
      receiving, from a data provider, a first item including first details originally published by a first of the content providers and not tagged with a physical location, and a second item including second details originally published by a second of the content providers and tagged with a physical location,
wherein the router data matches at least in part with the first item and the second item;
determining that the first and second items were associated with the network router; and
tagging the first details with the physical location.

11. At least one non-transitory computer-readable medium storing instructions, which when executed cause at least one data processing device to perform a method of enhancing business intelligence data with location-based social media feeds, the method comprising:
receiving, from a network router connecting a specific network with the Internet, router data regarding network communication between one or more content providers and one or more devices connected to the network router in the specific network;
receiving from a data provider, a first item including first details originally published by a first of the content providers and not tagged with a physical location, and a second item including second details originally published by a second of the content providers and tagged with a physical location,
wherein the router data matches at least in part with the first item and the second item;
determining that the first and second items were associated with the network router; and
tagging the first details with the physical location.

12. The computer-implemented method of claim 1, further comprising;
receiving, by the processor, from a business server, business data of a business entity,
wherein the business data is associated with the first physical location;
processing the first and second items and the business data in combination; and
delivering the processed data to a remote location.

13. The system of claim 10, the method further comprising:
receiving, from a business server, business data of a business entity,
wherein the business data is associated with the physical location;
processing the first and second items and the business data in combination; and
delivering the processed data to a destination location.

14. The at least one non-transitory computer-readable medium of claim 11, the method further comprising:
receiving, from a business server, business data associated with the physical location;
combining the first and second items and the business data; and
delivering the combined data to the business server.

15. The computer-performed method of claim 12, wherein the business data includes information regarding quality, pricing, inventory, budget, sales, or marketing related to products or services offered by the business entity.

16. The computer-performed method of claim 12, wherein the first item or the second item indicates a statement, an opinion, a sentiment, a decision, or an influence of a creator of the first item or the second item regarding the business entity.

17. The computer-performed method of claim 12, wherein the processing includes sorting, filtering, aggregating, correlating, or summarizing one or more portions of the first and the second items and the business data.

18. The computer-performed method of claim 12, wherein the delivering includes sending the processed data to the business server according to an application programming interface.

19. The computer-performed method of claim 12, wherein the delivering includes sending the processed data to a display device to form a graphical user interface (GUI).

20. The computer-performed method of claim 19, further comprising:
receiving a request through the GUI to display a map for the first physical location; and
sending the requested map to the display device.

21. The computer-performed method of claim 12,
wherein the first physical location corresponds to a physical store of the business entity, and
wherein the first item or the second item indicates that a creator of the first item or the second item performs an activity at a certain time.

* * * * *